United States Patent [19]

Kemper

[11] Patent Number: 4,522,079
[45] Date of Patent: * Jun. 11, 1985

[54] CONTINUOUSLY VARIABLE TRANSMISSION UNIT

[75] Inventor: Yves J. Kemper, Birmingham, Mich.

[73] Assignee: Caterpillar Tractor Co., Peoria, Ill.

[*] Notice: The portion of the term of this patent subsequent to Nov. 18, 1997 has been disclaimed.

[21] Appl. No.: 348,938

[22] PCT Filed: May 19, 1980

[86] PCT No.: PCT/US80/00582
§ 371 Date: Dec. 23, 1981
§ 102(e) Date: Dec. 23, 1981

[87] PCT Pub. No.: WO81/03369
PCT Pub. Date: Nov. 26, 1981

[51] Int. Cl.³ .................... F16H 15/16; F16H 15/00; F16H 15/50
[52] U.S. Cl. ..................... 74/191; 74/190; 74/796
[58] Field of Search .......... 74/191, 193, 192, 190, 74/796

[56] References Cited

U.S. PATENT DOCUMENTS

| | | | |
|---|---|---|---|
| 2,062,901 | 12/1936 | Graham | 74/796 |
| 2,239,983 | 4/1941 | Bade | 74/796 |
| 2,240,148 | 4/1941 | Schmitter et al. | 74/796 |
| 2,243,224 | 5/1941 | Schmitter et al. | 74/796 |
| 4,112,779 | 9/1978 | Kemper et al. | 74/191 |
| 4,112,780 | 9/1978 | Kemper et al. | 74/191 |
| 4,152,946 | 5/1979 | Kemper | 74/196 |
| 4,233,851 | 11/1980 | Kemper | 74/191 |
| 4,233,859 | 11/1980 | Kemper et al. | 74/191 |

Primary Examiner—Lawrence J. Staab
Assistant Examiner—Michael D. Bednarek
Attorney, Agent, or Firm—Charles E. Lanchantin, Jr.

[57] ABSTRACT

A power input and output system for continuously variable transmission units of the type in which a nutatable traction body is supported both for rotation on the body axis and for nutational movement in which the body axis travels in a biconical path about a primary transmission axis. Power input and output members of the transmission unit are each linked to the nutatable body by gearing to be in direct torque transmitting relationship only with the nutatable body and so that the nutational component of movement is the result solely of traction surfaces on the body being in rolling frictional engagement against complementing and fixed traction surfaces.

10 Claims, 7 Drawing Figures

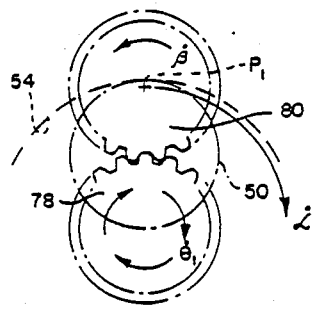
FIG. 2.
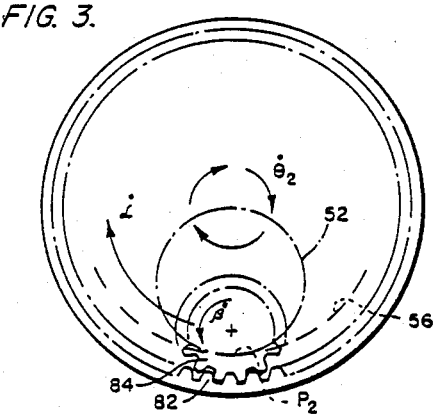
FIG. 3.
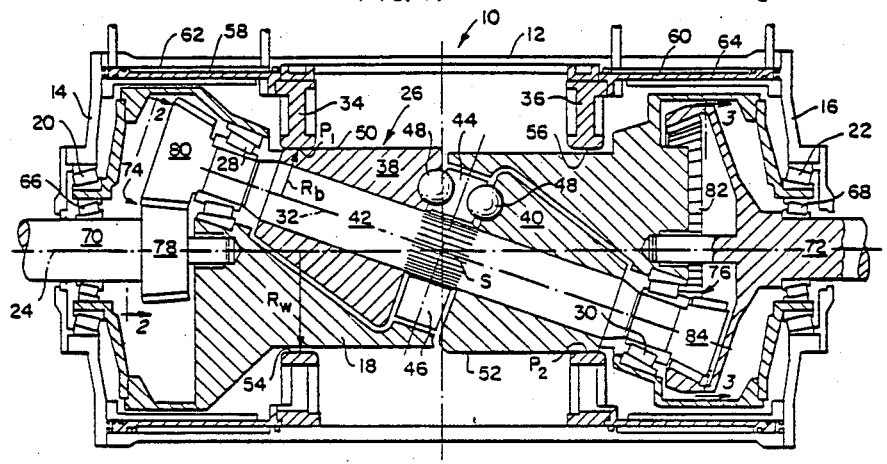
FIG. 1.
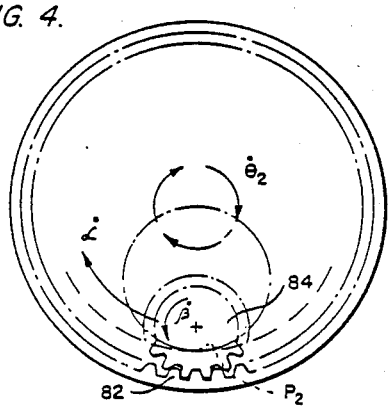
FIG. 4.
FIG. 5.

CONTINUOUSLY VARIABLE TRANSMISSION UNIT

BACKGROUND OF THE INVENTION

This invention relates to torque transmissions and more particularly, it concerns improvements in continuously variable ratio transmission units by which the ratio range of such units is increased over the ratio range of presently available units without compromise in operating efficiency and power density.

Various embodiments of continuously variable transmissions in which the present invention is particularly useful are disclosed in U.S. Pat. Nos. 4,112,779 and 4,112,780, both issued Sept. 12, 1978 and in 4,152,946 issued on May 8, 1979. In the type of transmission exemplified by these patents, three frame supported working bodies operate to transmit a mechanical power input to a rotatable output at continuously variable output/input speed ratios within the design range of the transmission. For purposes of definition in this background discussion as well as in the ensuing detailed description of the present invention and in the appended claims, the three working bodies may be termed respectively, an "alpha body" which is supported by the transmission frame to be concentric with a first axis, a "beta body" which is concentric with a second axis inclined with respect to and intersecting the first axis at a point of axes intersection, and an "omega body" carried by or forming part of the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

The capability for the continuously variable speed ratio in such transmissions is achieved by providing one of the beta and omega bodies with a pair of rolling or traction surfaces which are surfaces of revolution about the concentric body axis and which are of variable radii along that axis in symmetry with the point of first and second axes intersection. Physically, such rolling surfaces will be provided by conical or cone-like members. The other of the beta and omega bodies is provided with a pair of rolling or traction surfaces of revolution about the concentric body axis but which are of relatively constant radius. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\overset{\circ}{\alpha}$) about the first axis, the rotational speed of the beta body about the second axis in a fixed frame of reference is ($\overset{\circ}{\beta}$) and the rotational speed of the omega body on the first axis is ($\overset{\circ}{\omega}$), then the respective speeds of the three bodies are related by the following equation:

$$\overset{\circ}{\omega} - \overset{\circ}{\alpha} + (\overset{\circ}{\alpha} - \overset{\circ}{\beta}) R_b/R_w = 0. \tag{1}$$

A generally preferred mode of operating such transmissions has been to apply an input torque to the alpha body to carry the beta body in nutation and hold the omega body against rotation ($\overset{\circ}{\omega} = 0$). The beta body is linked with an output shaft rotatable on the first axis by gearing having a ratio factor (k) which theoretically may be of any value and also may be made either positive or negative depending on the particular gearing arrangement used. In light of the foregoing, where $\overset{\circ}{\theta}$ is unit output speed and taking into account the gearing ratio (k), the output/input speed ratio of the unit is determined by an equation:

$$\overset{\circ}{\theta}/\overset{\circ}{\alpha} = 1 - kR_w/R_b. \tag{2}$$

If, for convenience, the function $R_w/R_b$ is designated as a radius ratio or ($\rho$), then Equation (2) becomes:

$$\overset{\circ}{\theta}/\overset{\circ}{\alpha} = 1 - k\rho. \tag{3}$$

The performance characteristics of such transmissions are described in an article entitled: "Performance of a Nutating Traction Drive" by P. Elu and Y. Kemper, paper no. 80-C2/DET-63, the American Society of Mechanical Engineers. In this Article, it is noted that extremely high overall efficiencies are possible by appropriate selection of the gear ratio factor (k) though with a corresponding reduction in the transmission speed ratio range (e.g., 2.8/1.9 or 1.5 vs. 0.43/0 or $\infty$). The Article also makes reference to a "power multiplication factor" which results from the epicyclic motion of the nutating beta body or member and which may be visualized as variation in the power "seen" at the points of rolling friction engagement between the beta and omega bodies for a given power input. Also, the term "power density" is used in the Article to express the power transmitting capacity of a particular transmission unit for a given input speed.

Heretofore, all embodiments of transmissions of the type disclosed in the aforementioned U.S. patents or "nutating traction drives" have involved a direct connection of one of the unit input and unit output to a first of the alpha, beta or omega bodies, a retention of a second of such bodies as a reaction member and preferably a gearing linkage (with a gear ratio k) of the other of the unit input and the unit output to the third of such bodies. As a result, the attainment of high overall efficiencies and increased power densities was possible only with a severe curtailment of speed ratio range. In this respect, it should be noted that the radius ratio or ($\rho$) in Equation (3) is variable within limits dictated by the size and geometry of the transmission.

It is apparent, therefore, that continuously variable transmissions of the type mentioned are capable of achieving high operating efficiencies. It is equally apparent, however, that a need exists for expanding the speed ratio range of such transmissions without compromise of operating efficiency or of high power densities.

SUMMARY OF THE INVENTION

In accordance with the present invention, the nutatable beta body in transmission units of the general class described, is linked by separate gear sets to respective input and output members of the transmission unit. Preferably, the input and output members are supported directly by the transmission unit frame for rotation about the primary or first transmission axis and each such member carries a keyed or otherwise rotatably fixed gear providing one of at least two gears in each of the separate gear sets. The input or output member carried gear preferably meshes directly with another gear of each gear set which is keyed or otherwise nonrotatably coupled directly for rotation with the beta body about the second or nutating transmission axis. Although the beta body is carried rotatably by the alpha body as in past designs, in this instance, the alpha body rotates freely in the transmission frame and is not connected either directly or by gearing to the input or the output members of the transmission. Also, the unit is reversible in the sense that it may be used as a speed reducer or inverter.

A primary object of the present invention is, therefore, to provide a continuously variable transmission of the class described with an increased range of speed ratios for a given high range of operating efficiencies and power density. Other objects and further scope of applicability will become apparent from the detailed description to follow taken in conjunction with the accompanying drawings in which like parts are designated by like reference numerals.

BRIEF DESCRIPTION OF THE DRAWINGS

FIG. 1 is a longitudinal cross-section through a continuously variable transmission unit incorporating the present invention;

FIG. 2 is a schematic cross-sectional view as seen on line 2—2 of FIG. 1;

FIG. 3 is a schematic cross-sectional view as seen on line 3—3 of FIG. 1;

FIGS. 4 and 5 are schematic cross-sectional views identical respectively to FIGS. 3 and 2 and included to facilitate an understanding of rotational components when the direction of power transmitted through the unit of FIG. 1 is reversed;

DETAILED DESCRIPTION OF THE PREFERRED EMBODIMENT

Figure 6:
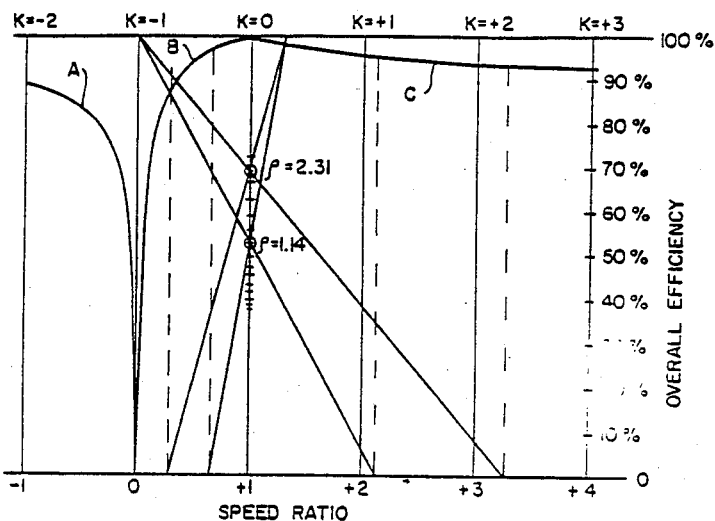
FIG. 6 is a graph depicting the relationship of internal transmission gear ratio factors and radius ratio factors to overall efficiency and unit speed ratios.

In FIG. 1 of the drawings, a continuously variable transmission unit or CVT is generally designated by the reference numeral 10 and shown to include a frame 12 of cylindrical configuration and closed at its ends by end plates or frames 14 and 16. Contained within the frame 12 are: an alpha body 18 supported from the end frames 14 and 16 by bearings 20 and 22, respectively, for rotation about a primary or first transmission axis 24; a beta body generally designated by the reference numeral 26 and supported rotatably by the alpha body 18 through bearings 28 and 30 for rotation about a second axis 32 inclined with respect to and intersecting the first axis 24 at a point S of axes intersection; and an omega body constituted in this instance by a pair of rings 34 and 36 concentric with the first axis 24, fixed against rotation with respect to the frame 12 and shiftable axially along the first axis 24 toward and away from the point S of axes intersection.

In the disclosed embodiment, the beta body 26 includes a pair of oppositely convergent truncated cone members 38 and 40 supported by a central shaft 42 journalled at opposite ends in the aforementioned bearings 28 and 30. The cone members 38 and 40 are carried by the shaft 42 to permit relative rotary and axial movement of the cone members and the shaft. The cone members are separated axially on the shaft by a ball/ramp assembly 44. Although the assembly 44 is only partially illustrated in FIG. 1 to include a collar 46 splined for direct rotation with the shaft 42 but permitting of axial movement relative to the shaft, and a pair of balls 48, it will suffice for purposes of a complete understanding of the present invention to note that the assembly 44 operates as a torque coupling of the cone members 38 and 40 with the shaft 42 and also to develop a thrusting force acting to separate the cone members 38 and 40 along the axis 32 in response to torque transmission between the shaft 42 and the cone members 38 and 40.

The cone members 38 and 40 define exterior traction surfaces or beta surfaces 50 of revolution about the axis 32 and of a radius $R_b$ which is variable along the axis 32 as a result of the conical configuration of the surfaces 50 and 52. The beta surfaces forcibly engage a pair of omega surfaces 54 and 56 formed on the interior of the rings 34 and 36 at two points of contact P1 and P2 which are diametrically opposite from each other and located in a plane containing the first and second axes 24 and 32. The omega surfaces 54 and 56 are of a constant or fixed radius $R_w$ and are surfaces of revolution about the first axis 24.

The rings 34 and 36 are adjustable axially along the axis 24 as a result of their connection in the disclosed embodiment to annular pistons 58 and 60 contained respectively in annular chambers 62 and 64 in the frame 12. By appropriate supply and exhausting of hydraulic fluid to the chambers 62 and 64, it will be appreciated that the rings 34 and 36 may be moved axially toward and away from the point S and in a manner to be symmetrically positioned with respect to the point S at all times.

Supported for rotation in each of the end frames 14 and 16 independently of the alpha body 18 by bearings 66 and 68 are a pair of shafts 70 and 72. In the interest of adapting terminology which is consistent with terms used in algebraic equations, the shafts 70 and 72 are referred to as "theta shafts" and may function to transmit a power input to or a power output from the unit 10 in a manner which will be described in more detail below.

Each of the theta shafts 70 and 72 is linked by a separate gear set 74 and 76, respectively, to the beta body 26 and specifically to the shaft 42 thereof. In the disclosed embodiment, each of the gear sets 74 and 76 includes two directly meshing gears. Thus, the gear set 74 includes a beveled pinion or sun gear 78 keyed or otherwise coupled for direct rotation with the theta shaft 70 and a complementary bevel or planet gear 80 similarly coupled for direct rotation with the shaft 42 and the beta body 26. The gear set 76, on the other hand, includes a ring gear 82 coupled for direct rotation with the theta shaft 72 and which is in direct meshing engagement with a planet gear 84 coupled for rotation with the shaft 42 and the beta body 26.

In the illustrated embodiment, the gears 78 and 80 of the gear set 74 are of the same diameter and as such will have a ratio factor k1 equal to a numerical value of 1. Because the gears 78 and 80 would rotate in opposite directions, assuming the axis of both to be in a fixed frame of reference, the ratio factor k1 will be algebraically negative. The ratio factor k2 of the gear set 76 is equal to the diameter of the pinion gear 84 divided by the diameter of the ring gear 82 and will be of a numerical value less than 1, for example 0.25. Because the gears 84 and 72 will rotate in the same direction in a fixed frame of reference, the ratio factor k2 will be algebraically positive.

In the operation of the unit 10, assuming a power input to the shaft 70 and a rotational speed $\overset{\circ}{\theta}1$ and an output from the shaft 72 at a speed $\overset{\circ}{\theta}2$, the input/output speed ratio of the transmission is determined by the equation:

$$\overset{\circ}{\theta}1/\overset{\circ}{\theta}2=(1-k1\rho)/(1-k2\rho). \qquad (4)$$

In FIGS. 2 and 3 the directions of rotation in the alpha body 18, the beta body 26, as well as the theta shafts 70 and 72 are graphically presented. Thus, in FIG. 2, the power input at the speed $\overset{\circ}{\theta}1$ in a clockwise direction tends to rotate the gear 80 and the beta body 26 in a counter clockwise direction. Because of the contacting beta and omega surfaces, the alpha body will rotate in a clockwise direction. At the other end of the transmission, the ring gear 82 will be rotated at the speed $\overset{\circ}{\theta}2$ as a result primarily of the $\overset{\circ}{\alpha}$ component of rotation. Because the direction of the $\overset{\circ}{\beta}$ is opposite to the $\overset{\circ}{\alpha}$ rotation, the $\overset{\circ}{\theta}$ speed may be visualized as the velocity $\overset{\circ}{\alpha}$ of the alpha body diminished by the $\overset{\circ}{\beta}$ rotation of the beta body 26.

In FIGS. 4 and 5, it is assumed that the shaft 72 is the power input whereas the shaft 70 is the output of the transmission. Thus if the shaft 72 and the ring gear is rotated in a clockwise direction (as viewed from the right end of FIG. 1) the gear 84 is prevented from rotation in a clockwise direction because of its connection through the beta body to the stationary omega rings 34 and 36. Accordingly, the ring gear 82 will operate to carry the beta body in nutation and develop primarily rotation in the alpha body 18. The direction of rotation in the beta body will again be counter clockwise in a relative frame of reference because the axis of the gear 84 is orbiting at the velocity $\overset{\circ}{\alpha}$. At the output shaft 70, the rotational components $\overset{\circ}{\alpha}$ and $\overset{\circ}{\beta}$ will combine or add to each other in driving the shaft 70 through the gear 78. In so directing a power input to the shaft 72 and taking a power output from the shaft 70 the unit 10 now functions as an inverter or a transmission in which the output shaft is rotated at higher speeds than the input shaft. Other operational characteristics such as the ratio range, the range of efficiency and power density remain unchanged.

If it is assumed further that the numerical value of the radius ratio $\rho$ (see Equation (3) supra.) is variable between a maximum $\rho\uparrow=2.31$ and a minimum $\rho\downarrow=1.14$ and that the gear ratio factors k1 and k2 are, respectively, equal to $-1$ and $+0.25$, it will be seen that the input/output speed ratios may be made to vary between approximately 7.8:1 and 3:1. The ratio range of the transmission or the maximum input/output speed ratio divided by the minimum input/output ratio is approximately 2.6. As will be described below with reference to the graph illustrated in FIG. 6, this range of speed ratios is more than 1½ times the ratio range attainable in prior designs in which the input was connected directly to the alpha body 18. Moreover, because the range of input/output speed ratios avoids the condition in which the output shaft speed or $\overset{\circ}{\theta}$ approaches zero, power multiplication at the contact points P1 and P2 is minimized with the result that operation throughout the speed ratio range occurs at high efficiencies. The power density of the unit 10 is, therefore, increased substantially.

In the graph of FIG. 6, overall efficiency of a nutating traction drive of the general class including the embodiment of FIG. 1 are plotted against speed ratio (output/input) to develop curves A, B, and C. The graph also includes a linear horizontal scale representing the various gear ratio factors (k) and a hyberbolic scale coincident with a speed ratio of unity or 1:1 and a gear ratio factor of zero to represent various values of the radius ratio ($\rho$). Lines joining a specific gear ratio factor (k) with minimum ($\rho\downarrow$) and maximum ($\rho\uparrow$) radius ratios in a given transmission will intersect the abscissa axis at points corresponding to the upper and lower limits of speed ratio variation. By transposing these limits of speed ratio to the curves A, B, or C, the overall efficiency of a machine for a given gear ratio (k) may be determined.

It is important to note that the curves in FIG. 6 are the result of operation with a constant power input connected directly to the alpha body or operation in accordance with Equation (3) supra. where the function $\alpha$ is constant. In the transmission of the present invention, however, the rotational speed $\overset{\circ}{\alpha}$ of the alpha body 18 is related to the respective theta shafts 70 and 72 by the equations:

$$\overset{\circ}{\alpha}=\overset{\circ}{\theta}1/(1-k1\rho) \qquad (5)$$

or $$\overset{\circ}{\alpha}=\overset{\circ}{\theta}2/(1-k2\rho). \qquad (6)$$

Although the Equations (5) and (6) will yield the same value of $\overset{\circ}{\alpha}$ where the values of k1, k2 and $\rho$ are given, both are provided to facilitate relation of the values of $\overset{\circ}{\alpha}$ to a constant speed input which may be provided either at the theta shaft 70 or the theta shaft 72.

From the foregoing and with reference to FIG. 6, it will be seen that by the present invention, the respective gear ratio factors k1 and k2 are selected to be of opposite algebraic sign and of numerical values to provide a range of speed ratios corresponding to high operating efficiency ranges on each of the curves B and C. Although the two ranges of speed ratios are separated or non-contiguous in FIG. 6, due to the curves being predicated on a constant $\overset{\circ}{\alpha}$ speed, the speed of the alpha body 18 or $\overset{\circ}{\alpha}$ in the present invention will vary so that the resulting range of the speed ratios is, moreover, the product of multiplying the ratio range provided using k1 at a constant $\overset{\circ}{\alpha}$ (i.e., 3.31/2.14 or 1.5) by the ratio range using k2 at a constant $\overset{\circ}{\alpha}$ (i.e., 0.72/0.42 or 1.7). In other words, the range of speed ratios in accordance with the present invention given the indicated numerical parameters will be 1.5×1.7 or 2.6.

Figure 7:
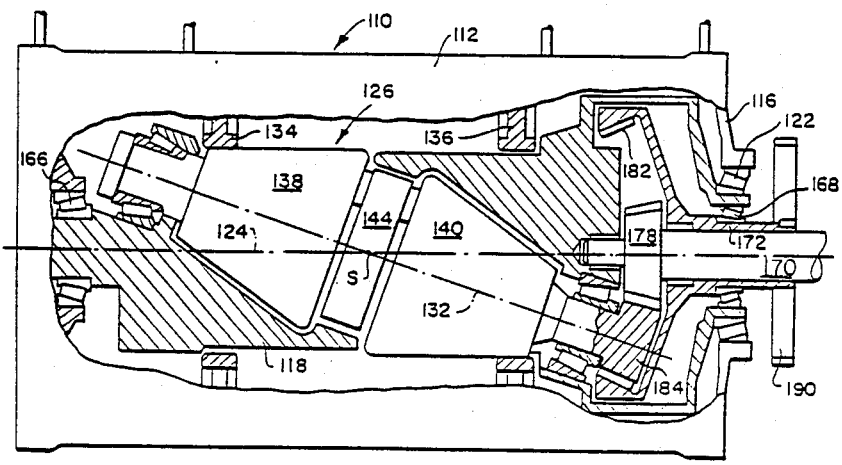
FIG. 7 is a side elevation in partial longitudinal section and illustrating an alternative embodiment of the invention.

In FIG. 7 of the drawings, an alternative embodiment of the invention is shown in which parts corresponding to the embodiment previously described with reference to FIG. 1 are designated by the same tens and digits numerals but to which one hundred has been added. The primary difference between the embodiment illustrated in FIG. 7 and that of FIG. 1 is that the latter embodiment is particularly suited for transmission applications in which a power input and power output are located on the same end of the transmission. Thus in FIG. 7, concentric theta shafts 170 and 172 are journalled in the end frame 116. The theta shaft 170 is keyed directly to a sun gear 178 which is in mesh with a planet gear 184 keyed for rotation with the beta body in the same manner as either of the gears 80 and 84 of the previous embodiment. The planet gear 184 also meshes with an internal ring gear 182 fixed for rotation with the outside theta shaft 172. A pinion gear 190 is keyed to the shaft 172.

The operation of the embodiment in FIG. 7 is the same as that of FIG. 1 and needs no further discussion except to note that where the theta shaft 170 is the input shaft to the transmission 110, the unit will operate as a reducing transmission with the gear ratio factor k1 being the diametric ratio of the gears 178 and 184 and the factor k2 being the diametric ratio of the gear 184 to the ring gear 182. Power output will be taken from the shaft 172 and pinion gear 190.

The embodiment of FIG. 7 is particularly suited for use in transmission applications where the linear space available in a drive line for the transmission is limited. An example of such an application is a front-wheel drive automotive vehicle in which an engine or power plant, the transmission and drive wheels are located one above the other.

Thus it will be seen that as a result of the present invention, a highly effective continuously variable transmission unit is provided by which the speed ratio range is increased in a very simple manner and without complex structure. It will also be apparent to those skilled in the art from the preceding description that modifications and/or variations may be made in the embodiments disclosed herein without departure from the present invention. Accordingly, it is expressly intended that the foregoing description is illustrative only, not limiting, and that the true spirit and scope of the present invention be determined by reference to the appended claims.

I claim:

1. In a continuously variable transmission having a rotatable input, a rotatable output, a frame, an alpha body supported by said frame for rotation about a first axis, a biconical beta body supported by said alpha body for rotation on a second axis inclined with respect to and intersecting said first axis at a point of axes intersection located centrally along the length of said beta body so that movement of said second axis is confined to nutation on said point and about said first axis, said beta body having a pair of beta traction surfaces of revolution about said second axis one such surface being located on each side of said point of axes intersection, means for defining a pair of omega surfaces of revolution about said first axis, said beta and omega surfaces being in rolling friction engagement with each other at two points in a plane containing said first and second axes, said beta and omega surfaces further defining a radius ratio which is variable upon shifting the location of said points of rolling friction engagement relative to said point of axes intersection, the improvement comprising:

first means for supporting said alpha body for rotation about said first axis dependent solely on the speed at which said second axis is driven in nutation about said first axis by said beta body;

second means for drivingly coupling said input and said beta body and defining a first gear ratio factor;

third means for drivingly coupling said beta body and said output and defining a second gear ratio factor differing from said first gear ratio factor; and said first and second gear ratio factors being related to said variable radius ratio so that the range of output/input speed ratios of the transmission is greater than the range of such speed ratios attainable by said radius ratio alone.

2. The transmission of claim 1 wherein said first and second gear ratio factors are of opposite algebraic signs.

3. The transmission of claim 2 wherein said first and second gear ratio factors are of different numerical values.

4. The transmission of claim 1 wherein said second means includes a sun gear rotatable on said first axis and planet gear means rotatable on said second axis with said beta body and in meshing engagement with said sun gear, and said third means includes a ring gear rotatable on said first axis and in mesh with said planet gear means.

5. The transmission of claim 4 wherein said sun and ring gears are at opposite ends of said beta body, and said planet gear means includes separate pinion gears fixed at opposite ends of said beta body.

6. The transmission of claim 4 wherein said planet gear means includes a single pinion gear fixed to one end of said beta body, said sun and ring gears being mounted for independent rotation at one end of said beta body and both being in meshing engagement with said single pinion gear.

7. The transmission of claim 1 wherein said radius ratio ($\rho$), said first gear ratio factor (k1) and said second gear ratio factor (k2) are related to the speed ratio ($\dot{\theta}1/\dot{\theta}2$) by the equation:

$$\dot{\theta}1/\dot{\theta}2 = (1-k1\rho)(1-k2\rho),$$

said first gear ratio factor (k1) being less than zero or negative and said second gear ratio factor (k2) being more than zero or positive.

8. The transmission of claim 7 wherein the function k2$\rho$ is always less than 1.

9. The transmission of claim 1 wherein said second means includes a gear set having a sun gear intermeshed with a planet gear.

10. The transmission of claim 1 wherein said third means includes a gear set having a planet gear intermeshed with a ring gear.

* * * * *